United States Patent
Kim et al.

(10) Patent No.: US 8,411,209 B2
(45) Date of Patent: *Apr. 2, 2013

(54) DISPLAY DEVICE AND METHOD FOR LABELING AV SIGNAL INPUT SOURCES

(75) Inventors: In Hoon Kim, Daegu (KR); Seung Jin Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,785

(22) Filed: Jan. 31, 2011

(65) Prior Publication Data

US 2011/0179450 A1    Jul. 21, 2011

Related U.S. Application Data

(63) Continuation of application No. 11/024,963, filed on Dec. 30, 2004, now Pat. No. 7,911,542.

(30) Foreign Application Priority Data

Dec. 31, 2003    (KR) ................ 2003-101468

(51) Int. Cl.
  *H04N 5/268*    (2006.01)
  *H04N 5/50*    (2006.01)
(52) U.S. Cl. ............... 348/706; 348/569; 348/563
(58) Field of Classification Search ........... 348/705, 348/706, 553–570, 731–733
See application file for complete search history.

(56) References Cited

U.S. PATENT DOCUMENTS

| | | | |
|---|---|---|---|
| 5,212,553 A | 5/1993 | Maruoka | |
| 5,253,067 A | 10/1993 | Chaney et al. | |
| 5,621,456 A | 4/1997 | Florin et al. | |
| 6,122,018 A | 9/2000 | Sugihara et al. | |
| 6,172,674 B1 | 1/2001 | Etheredge | |
| 2004/0194132 A1 | 9/2004 | Kawashima et al. | |
| 2005/0262535 A1 | 11/2005 | Uchida et al. | |
| 2007/0083888 A1* | 4/2007 | Liebhold | 725/37 |

FOREIGN PATENT DOCUMENTS

| | | | |
|---|---|---|---|
| CN | 1256842 A | | 6/2000 |
| JP | 01274572 A | * | 11/1989 |
| JP | 02283177 A | * | 11/1990 |
| JP | 2001-007824 | | 1/2001 |
| WO | WO 98/47283 | | 10/1998 |

OTHER PUBLICATIONS

Chinese Office Action dated Jul. 6, 2007.
Chinese Office Action dated Mar. 17, 2010.
U. S Office Action dated Nov. 8, 2007 for parent U.S. Appl. No. 11/024,963.
U. S Office Action dated Apr. 23, 2008 for parent U.S. Appl. No. 11/024,963.
U. S Office Action dated Nov. 13, 2008 for parent U.S. Appl. No. 11/024,963.
U. S Office Action dated Apr. 9, 2009 for parent U.S. Appl. No. 11/024,963.

(Continued)

*Primary Examiner* — Michael Lee
(74) *Attorney, Agent, or Firm* — KED & Associates LLP (57) ABSTRACT

A method for labeling input sources in a display device includes connecting to a plurality of input sources, at a plurality of input terminals within the display device, and then controlling display of a main input menu listing the input terminals and corresponding ones of the input sources. An image from one of the input sources or input terminals selected from the main input menu is displayed with a name of the input source and a name of the input terminal corresponding to the selection made from the main input menu. The main input menu may not be displayed when the image and names of the input source and input terminal are displayed.

31 Claims, 5 Drawing Sheets

OTHER PUBLICATIONS

U. S Office Action dated Nov. 9, 2009 for parent U.S. Appl. No. 11/024,963.

U. S Office Action dated Mar. 25, 2010 for parent U.S. Appl. No. 11/024,963.

* cited by examiner

DISPLAY DEVICE AND METHOD FOR LABELING AV SIGNAL INPUT SOURCES

CROSS-REFERENCE TO RELATED APPLICATIONS

This application claims the benefit of Korean Patent Application No. P2003-101468, filed on Dec. 31, 2003, which is hereby incorporated by reference as if fully set forth herein. Also, this application is a continuation of U.S. patent application Ser. No. 11/024,963, filed on Dec. 30, 2004 now U.S. Pat. No. 7,911,542, the content of which is incorporated herein by reference.

BACKGROUND

1. Field

One or more embodiments described herein relate to a display device.

2. Background

Generally, a television is provided with external input terminals for receiving various inputs from a video 1, a video 2, a component 1, a component 2, and a RGB, as well as a sky wave, that is, a RF (radio frequency) through an antenna. In this state, the television receives video and audio signals from the external input terminals, and outputs image and voice. Accordingly, a user can use various external devices of a VCR, a cable, a game, a DVD, and a set-top box connected with the respective external input terminals.

However, if the user cannot memorize respective connections between the external input terminals and the external devices, the user cannot directly change the external device to a desirable input source. For example, if the user desires to watch the DVD, the user cannot directly change to the corresponding input source. That is, there is requirement for sequentially selecting the respective input sources by using a remote control key, and checking the image according to the selected input source. Also, on inputting the input source, the image of the presently selected input source is displayed on a screen of the television. However, it is impossible for the user to check that the displayed image of the selected input source is outputted from which of the external devices.

In the television according to the related art, the user has to check the external device connected by the input terminal of the television and a signal line, for selection of the desirable input source.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
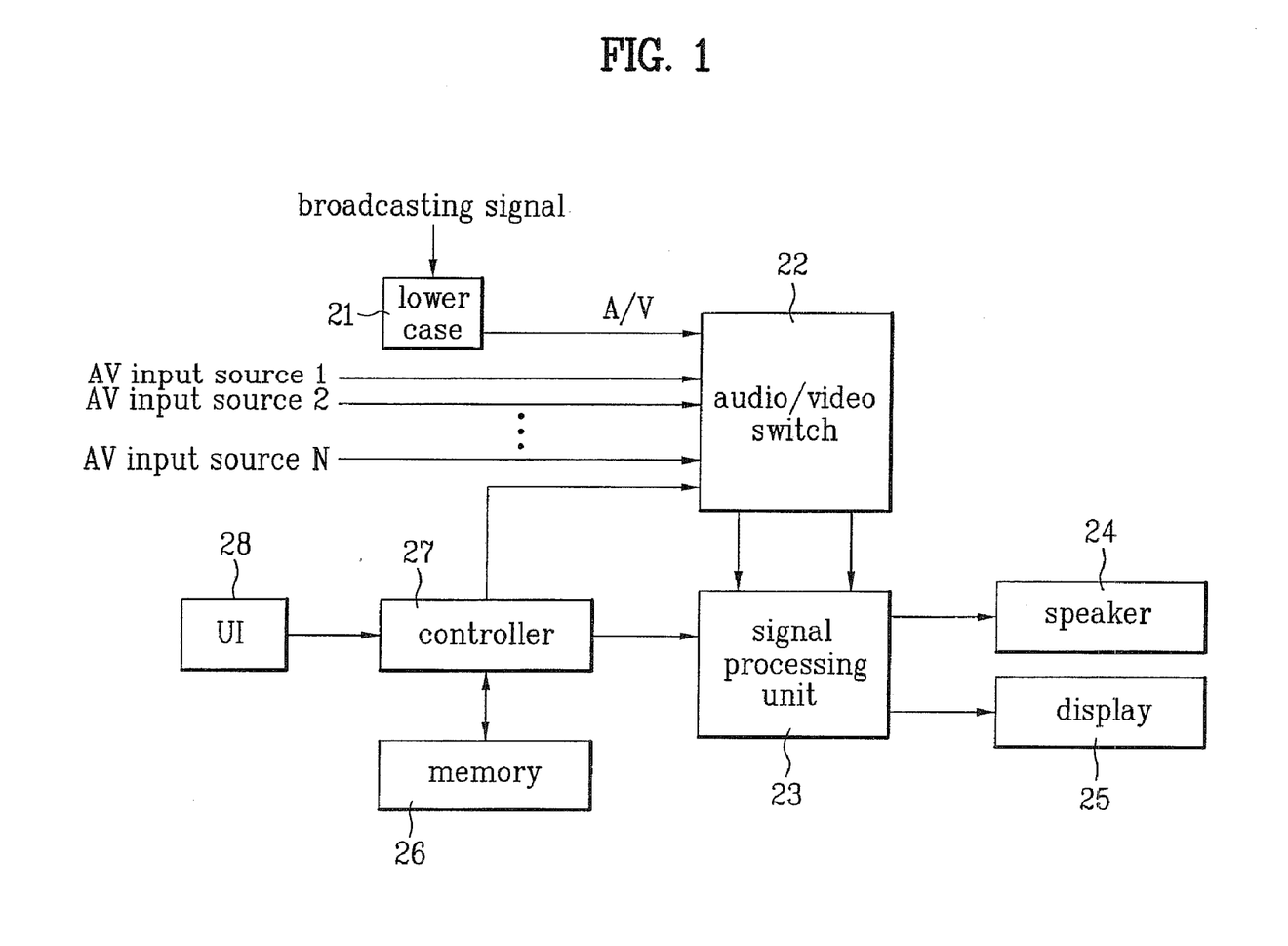
FIG. 1 shows one embodiment of a television having an input source labeling function.

FIG. 1 illustrates a display device (e.g., a television system) having an input source labeling function according to the present invention. As shown in FIG. 1, a tuner 21 tunes a terrestrial or cable broadcasting signal. Then, an audio/video switch 22 receives audio and video signals (AV signals) from various AV input sources (external devices), as well as the turned signal outputted from the tuner 21, and selects any one among the received signals, and then outputs the selected signal. For example, the audio/video switch 22 selects one of the AV signals from a VCR (video cassette recorder), a cable box, a video game system, a DVD (digital video disc) player, a set-top box, a camcorder, and a computer, and then outputs the selected signal. The signals received by the audio/video switch 22 include at least one of video, voice, supplemental information, and text data.

A controller 27 displays a menu for labeling the AV input sources on a display unit 25. Also, if a user inputs representative identifications (IDs) of the AV input sources and a system information of the AV input sources, the controller 27 stores the inputted representative identifications and the system information in a memory 26. For example, the system information of the AV input sources includes a system type, a manufacturer, a serial number, and a format of data outputted from the AV input source.

In addition, a user interface 28 receives a user's command, and transmits the user's command to the controller 27. The user interface 28 may be a remote controller or a key panel of the display device. The memory 26 stores the representative identifications of the AV input sources, and/or the system information of the AV input sources.

A signal processor 23 receives the AV signal outputted from the audio/video switch 22, and converts the signal to image and sound. That is, the signal processor 23 divides the received signal into a video signal and an audio signal, and it converts the video signal to a displayable image signal and converts the audio signal to a signal suitable for being outputting through a speaker 24. The signal processor 23 may include a video processor and an audio processor in order to perform these functions.

The display device according to the present invention includes a plurality of input terminals connected with the external AV input sources. For example, the display device according to the present invention, includes at least one of a video input terminal, a component input terminal, and an RGB input terminal, at the rear thereof, and includes a front input terminal at the front thereof. The input terminals are respectively connected with the external AV input sources, and the input terminals transmit the signals outputted from the external input sources to audio/video switch 22.

Figure 2:
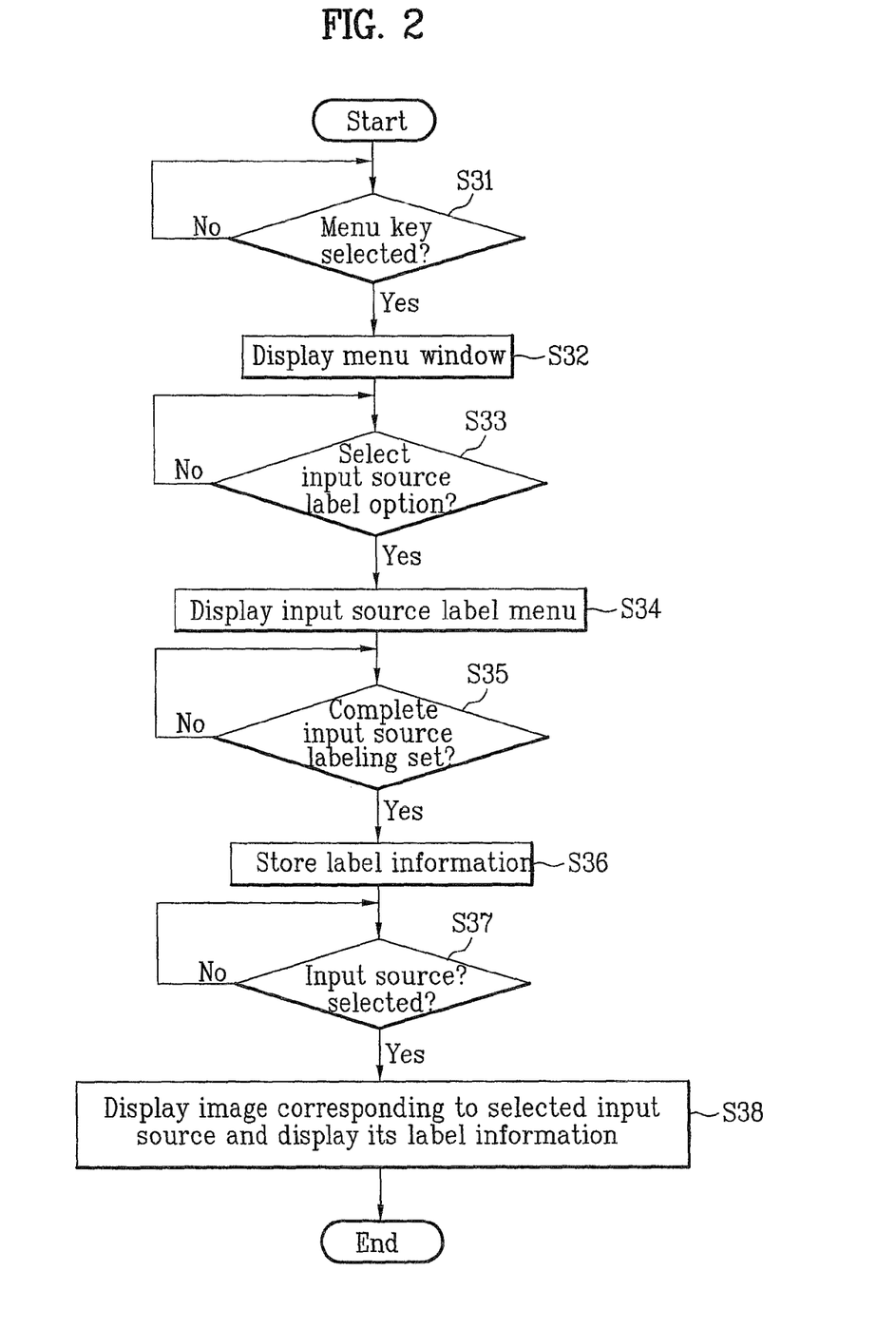
FIG. 2 shows steps included in an embodiment of an input source labeling method.

An AV input source labeling method according to the present invention will be described as follows. FIG. 2 illustrates a flow chart of illustrating the AV input source labeling method according to the present invention.

The controller 27 determines whether the user selects a menu key of the user interface 28 (S31). In this case, if the user selects the menu key, a menu window of an OSD (on screen display) type is displayed (S32).

Next, the controller 27 determines whether the user selects an option (Aux. Label) for labeling the AV input sources connected to the display device from the menu window (S33). If the user selects the option (Aux. Label), the controller 27 reads input terminal information stored in the memory 26. The input terminal information includes titles of the input terminals, a data format suitable for the input terminals, and a kind of the external AV input sources suitable for the input terminal.

Figure 3:
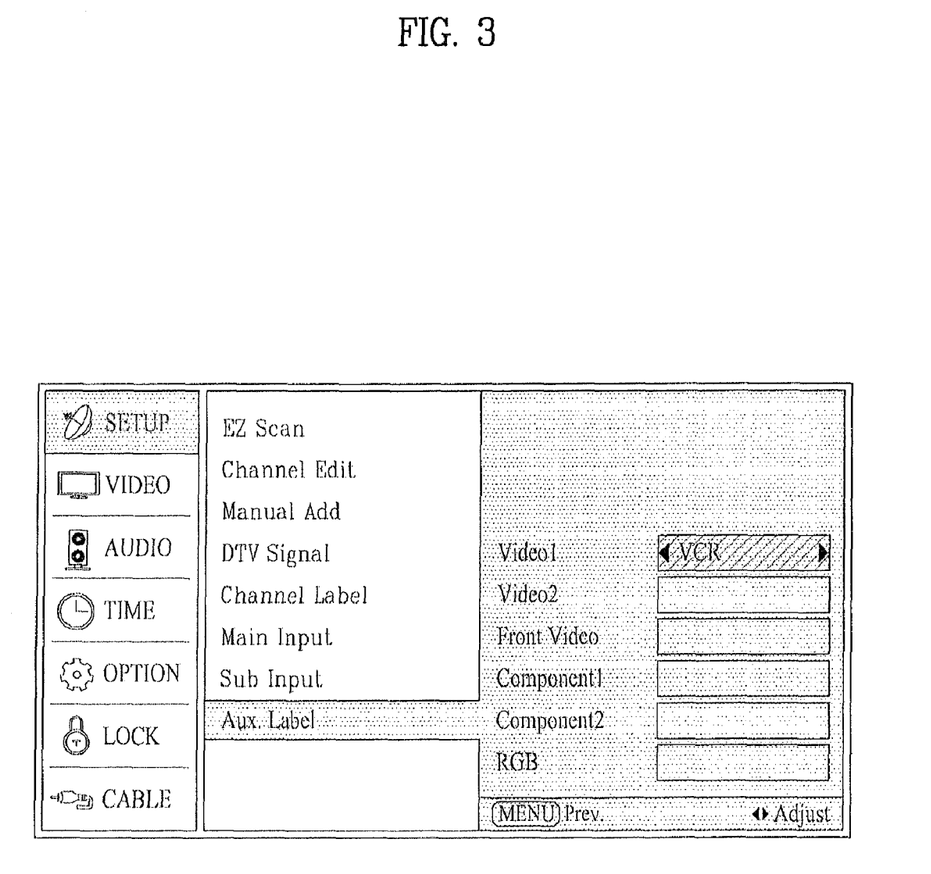
FIGS. 3 and 4 show examples of input source label menus for selecting or inputting IDs corresponding to input sources.

After selecting the option (Aux. Label) for labeling the input sources, as illustrated in FIG. 3, the controller 27 displays an input source label menu on a screen. The input source label menu includes a list of options for selecting one of pre-stored representative identifications of the AV input sources corresponding to the input terminals and an input field for manually inputting the representative identifications of the AV input sources corresponding to the input terminals. For example, the input source label menu includes a list of the input terminals such as a video 1, a video 2, a front video, a component 1, a component 2, and an RGB, and also includes the option list for selecting the external AV input sources (VCR, cable box, game, DVD, set-top box, computer, etc.). Also, the controller 27 may display the input terminal information.

Figure 4:
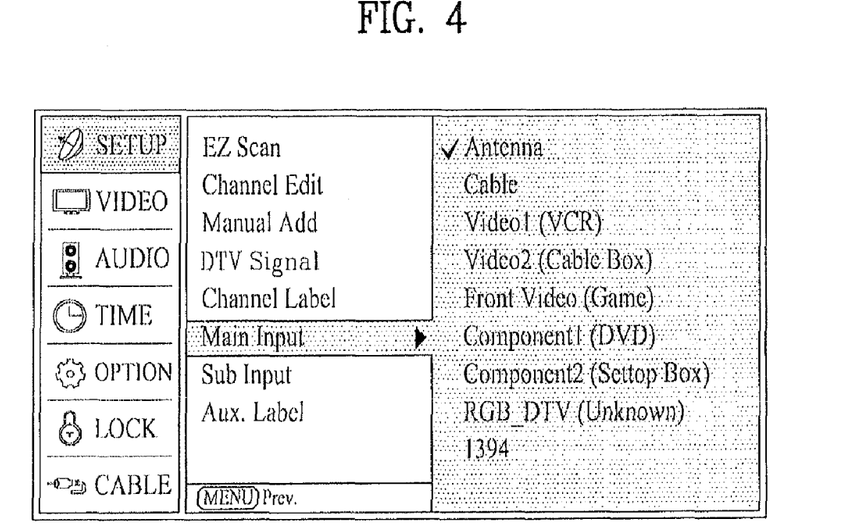

FIG. 4 illustrates the representative identifications selected or inputted for each AV input source. Referring to FIG. 4, it is possible for the user to select or input the representative identifications corresponding to the input terminals on the input source label menu by using the remote controller or the key panel of the display device. Also, the user may input the system information of the AV input sources by using the input source label menu. The system information of the AV input sources includes the class of the external device, the name of manufacturing company, the serial number, and the format of data outputted from the AV input sources.

On selecting the representative identifications of the AV input sources (S36), the user selects an option (Menu Prev.) for storing the selected representative identifications of the AV input sources and the system information of the AV input sources. After selecting the option (Menu Prev.), the controller 27 generates label information inclusive of the representative identifications and the system information of the AV input sources, and then stores the label information in the memory 26 (S36).

Figure 5:
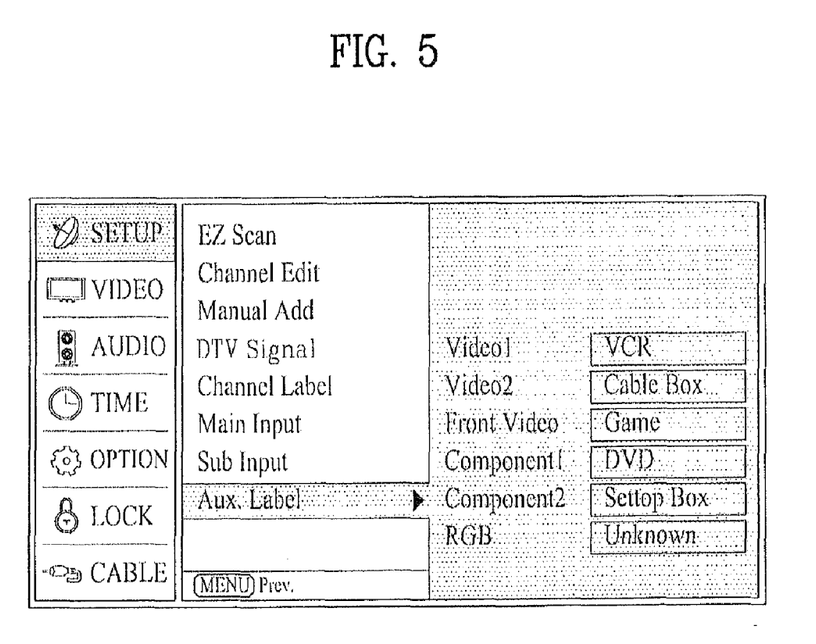
FIG. 5 shows a menu including a list of labeled input sources.

As described above, after labeling the AV input sources, the user may check or change the labeled AV input sources. If the user selects a main input option, the controller 27 reads the label information stored in the memory 26, and then displays a list of the labeled AV input sources on the screen, on the basis of the label information, as shown in FIG. 5.

Figure 6:
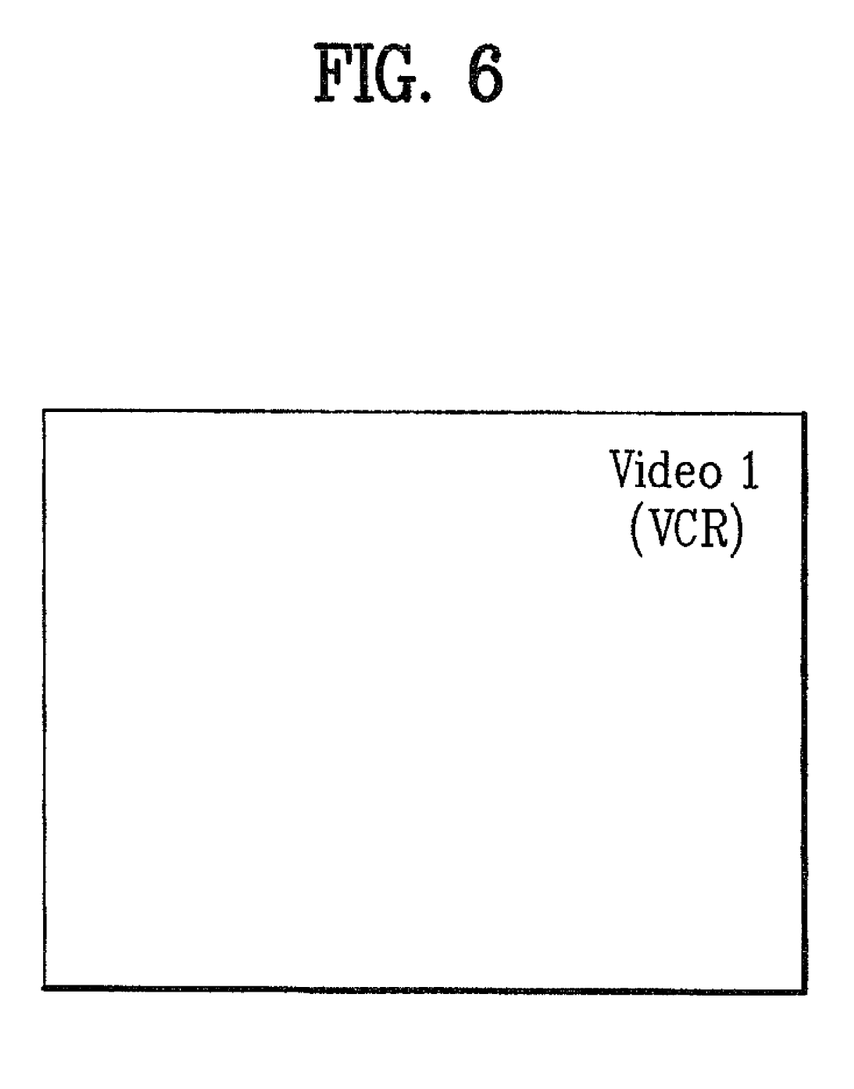
FIG. 6 shows a screen on which a labeled input source is displayed.

After labeling the AV input sources, the user may change the AV input sources providing the A/V signal during watching broadcasting. For example, the user selects the menu key of the user interface 28, as shown in FIG. 5, the controller 27 displays the list of the labeled AV input sources on the screen. Then, if the user selects one desirable AV input source from the list of the labeled AV input sources (S37), as shown in FIG. 6, the controller 27 displays the image outputted from the selected AV input source on the screen, and simultaneously, displays the representative identification (VCR) of the selected AV input source corresponding to the input terminal (Video 1) on one portion of the screen (S38). In this state, the corresponding input terminal (video 1) and the system information of the selected AV input source are also displayed on the screen. The representative identification (VCR) of the selected AV input source may be displayed on the screen during a predetermined time period, or may be displayed on the screen during an entire time period for displaying the image of the selected AV input source. If the representative identification of the AV input source is not displayed on the screen during playing the image of the selected AV input source, the user may select a confirmation key in order to display the representative identification of the selected AV input source on the screen.

Also, the user may use a hot key of the user interface 28 in order to display the representative identifications of the AV input sources along with the images of the AV input sources in sequence on the screen.

Accordingly, one or more embodiments described herein relate to a display device and a method for labeling AV input sources. In one or more of these embodiments, identification information of AV input sources are provided on a display screen.

In accordance with one embodiment, a method for labeling input sources in a display device comprises receiving first command signal for selecting a main input menu; displaying the main input menu stored in a memory, wherein the main input menu lists a name of an input terminal and a name of an input source corresponding to the input terminal; receiving second command signal for selecting the input terminal; displaying an image from the selected input terminal with the name of the input terminal and the name of the input source corresponding to the input terminal, wherein the main input menu is not displayed when the image and both of the names are displayed; and stopping displaying both of the names after a predetermined period of time expires.

The main input menu may further comprise a first region comprised of a name of a first input terminal if a name of an input source corresponding to the first input terminal is not inputted.

The main input menu may further comprise a second region comprised of a name of a second input terminal and a name of an input source corresponding to the second input terminal if the name of the input source corresponding to the second input terminal is inputted.

The method may also include receiving third command signal for selecting an input source label menu; controlling to read information on the input terminal stored in the memory; and displaying a kind of input sources suitable for the input terminal in the input source label menu. The input source label menu may further comprise system information corresponding to each of the input sources.

The step of receiving the first command signal may be performed by using a hot key in a remote controller or a key panel in the display device.

The method may further comprise receiving confirmation signal for displaying the both of the names; and displaying the both of the names for the predetermined period of time. Also, at least one of input terminals may be positioned at a rear region of the display device and at least one of the input terminals may be positioned at a front region of the display device. In addition, the image may comprise at least one of video information, text information or supplemental information.

In accordance with another embodiment, a method for labeling input sources in a display device comprises receiving first command signal for selecting an input source label menu; displaying the input source label menu, wherein the input source label menu comprises a list of input terminals and a window for selecting a name of an input source corresponding to one of the input terminals; receiving second command signal for selecting the name of the input source; storing the selected name of the input source corresponding to the one of the input terminals into a memory; receiving third command signal for selecting a main input menu; and displaying a name of the one of the input terminals and the stored name of the input source corresponding to the one of the input terminals in the main input menu.

The step of displaying the input source label menu may further comprise: controlling to read information on the input terminal stored in the memory; and displaying a kind of input sources suitable for the input terminal in the input source label menu. The input source label menu may further comprise system information corresponding to each of the input sources. Also, the step of receiving the second command signal performs by using an input field or an option list in the window.

In addition, the method may comprise receiving fourth command signal for selecting the one of the input terminals; displaying an image from the selected input terminal with the name of the input terminal and the name of the input source corresponding to the input terminal, wherein the main input menu is not displayed when the image and both of the names are displayed; and stopping displaying both of the names after a predetermined period of time expires.

In addition, the main input menu may comprise a first region comprised of a name of a first input terminal if a name of an input source corresponding to the first input terminal is not inputted. Also, the main input menu may comprise a second region comprised of a name of a second input terminal and a name of an input source corresponding to the second input terminal if the name of the input source corresponding to the second input terminal is inputted.

In addition, at least one of the input terminals may be positioned at a rear region of the display device and at least one of the input terminals may be positioned at a front region of the display device. In addition, the image comprises at least one of video information, text information or supplemental information.

In accordance with another embodiment, a method for labeling input sources in a display device comprises: displaying broadcast data; receiving first command signal for selecting a main input menu; displaying the main input menu listing a name of an input terminal and a name of an input source corresponding to the input terminal during displaying the broadcast data, wherein both of the names are stored in a memory; receiving second command signal for selecting the input terminal; and controlling an image from the selected input terminal to display and stopping displaying of the broadcast data.

The controlling step may comprise displaying the image from the selected input terminal with the name of the input terminal and the name of the input source corresponding to the input terminal, wherein the main input menu is not displayed when the image and both of the names are displayed; and stopping displaying both of the names after a predetermined period of time expires.

In addition, the main input menu may comprise a first region comprised of a name of a first input terminal if a name of an input source corresponding to the first input terminal is not inputted. The main input menu may also comprise a second region comprised of a name of a second input terminal and a name of an input source corresponding to the second input terminal if the name of the input source corresponding to the second input terminal is inputted.

In addition, the method may comprise receiving third command signal for selecting an input source label menu; controlling to read information on the input terminal stored in the memory; and displaying a kind of input sources suitable for the input terminal in the input source label menu. The input source label menu may further comprise system information corresponding to each of the input sources.

In addition, the step of receiving the first command signal may be performed by using a hot key in a remote controller or a key panel in the display device.

In addition, the method may comprise receiving confirmation signal for displaying the both of the names; and displaying the both of the names for the predetermined period of time. At least one of input terminals may be positioned at a rear region of the display device and at least one of the input terminals may be positioned at a front region of the display device. Also, the image may comprise at least one of video information, text information or supplemental information.

In the display device according to the present invention, the user can select the representative of the external AV input sources corresponding to the input terminal, and then the representative is stored in the memory. Accordingly, the user can identify the external AV input sources corresponding to the input terminals with easiness, and select the image of the desirable AV input source.

In accordance with another embodiment, a display device includes a plurality of input terminals respectively connected to a plurality of input sources; a controller configured to display a menu of setting label information of the input sources on a screen, and to display the corresponding label information along with an image of the input source selected by a user; and a memory configured to store the received label information of the input sources.

The menu includes a list of options for selecting one of pre-stored representative identifications of the input source, or includes an input field for manually inputting representative identification of the input source.

The label information includes representative identifications of the input sources, and further includes at least one of manufacturer of the input source, a serial number, and a format of data to be outputted from the input source.

The memory stores input terminal information. The input terminal information includes at least one of tides of the input terminals, a data format suitable for each of the input terminals, and a kind of the input sources suitable for each of the input terminals.

The controller displays an image of the input source selected by the user and the stored label information of the selected input source on the screen.

In addition, the display device further includes a switch for selecting one of signals received from the input sources, and a signal processor for converting an image of the input source selected by a user and the stored label information of the selected input source into a displayable signal.

In another aspect, a display device includes a memory configured to store representative identifications (IDs) of a plurality of input sources corresponding to a plurality of input terminals and system information of the input sources; and a controller for displaying the ID of the selected input source and the system information of the selected input source on a screen.

In another aspect, a method for labeling input sources includes displaying a menu for labeling a plurality of the input sources on a screen; setting representative IDs of the input sources corresponding to a plurality of input terminals and system information of the input sources by using the menu; and storing the set representative IDs and the set system information in a memory.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with the features of any other embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for labeling input sources in a display device, the method comprising:
   receiving a first command signal for selecting a first menu;
   displaying the first menu stored in a memory, wherein the first menu lists a plurality of names of input terminals and a plurality of names of input sources corresponding to one or more of the input terminals;
   receiving a second command signal for selecting one of the input terminals;
   displaying an image from the selected input terminal with the name of the selected input terminal and the name of the input source corresponding to the selected input terminal, wherein the first menu disappears when the image and the names of the selected input terminal and the input source corresponding to the selected input terminal are displayed; and
   causing display of the names to disappear after a predetermined period of time, wherein:
   a first input source is coupled to a first input terminal,
   a second input source is coupled to a second input terminal,
   names of the first and second input terminals are displayed in the first menu,
   the name of the second input terminal is displayed in the first menu with a name of the second input source which corresponds to the second input terminal, the name of the second input source is editable, and
   the method further comprises editing the name of the second input source as displayed in the first menu after a third command signal is received, wherein a name of the first input source corresponding to the first input terminal is not editable by a user.

2. The method of claim 1, further comprising:
   receiving a fourth command signal for selecting an input source label menu;
   reading information on one of the input terminals stored in the memory; and
   displaying information indicative of one or more kinds of input sources suitable for said one of the input terminals in the input source label menu.

3. The method of claim 2, wherein the input source label menu further comprises system information corresponding to one or more of the input sources.

4. The method of claim 1, wherein the first command signal is received from a link coupled to a remote controller or from a key panel in the display device, and wherein the first command signal is received based on activation of a hot key in the remote controller or key panel.

5. The method of claim 1, further comprising:
   receiving a confirmation signal for displaying the names; and
   displaying the names for the predetermined period of time.

6. The method of claim 1, wherein at least one of input terminals is positioned at a first region of the display device and another one of the input terminals is positioned at a second region of the display device different from the first region, and wherein the first and second regions are selected from the group consisting of a side surface, a front surface, or a rear surface of the display device.

7. The method of claim 1, wherein the image comprises at least one of video information, text information or supplemental information.

8. A method for labeling input sources in a display device, the method comprising:
   receiving a first command signal for selecting a first menu;
   displaying the a first menu, wherein the a first menu comprises a list of input terminals and an input field for selecting a name of an input source corresponding to one of the input terminals;
   receiving a second command signal for selecting the name of the input source;
   storing the selected name of the input source corresponding to the one of the input terminals in memory;
   receiving a third command signal for selecting a second menu; and
   displaying a name of the one of the input terminals and the stored name of the input source corresponding to the one of the input terminals in the second menu,
   wherein the input field is configured to allow for selection of one of a plurality of pre-stored representative identifications (IDs) for each of the input terminals, and is configured to receive a representative ID manually input from a user corresponding to one or more of the input sources, wherein the representative ID manually input from the user is different from the pre-stored representative IDs, the representative ID including a textual description of said one or more of the input sources.

9. The method of claim 8, wherein displaying the first menu comprises:
   reading information on one of the input terminals stored in the memory; and
   displaying one or more kinds of input sources suitable for said one of the input terminals in the first menu.

10. The method of claim 9, wherein the first menu further comprises system information corresponding to one or more of the input sources.

11. The method of claim 8, wherein receiving the second command signal is performed based on use of the or another input field or based on a displayed option list.

12. The method of claim 8, further comprising:
   receiving a fourth command signal for selecting the one of the input terminals;
   displaying an image from the selected input terminal with the name of the input terminal and the name of the input source corresponding to the input terminal, wherein the second menu is not displayed when the image and both names are displayed; and
   stopping display of both names after a predetermined period of time.

13. The method of claim 8, wherein a name of the first input terminal is displayed without a name of a corresponding input source in the second menu.

14. The method of claim 13, wherein the second menu displays a name of a second input terminal and a name of an input source corresponding to the second input terminal.

15. The method of claim 8, wherein at least one of input terminals is positioned at a first region of the display device and another one of the input terminals is positioned at a second region of the display device different from the first region, and wherein the first and second regions are selected from the group consisting of a side surface, a front surface, or a rear surface of the display device.

16. The method of claim 8, wherein the image comprises at least one of video information, text information or supplemental information.

17. A method for labeling input sources in a display device, comprising:
    displaying broadcast data;
    receiving a first command signal for selecting a first menu;
    displaying the first menu listing names of a plurality of input terminals and names of a plurality of input sources corresponding to one or more of the input terminals during displaying the broadcast data, wherein the names of the input terminals and input sources are stored in a memory;
    receiving a second command signal for selecting one of the input terminals; and
    controlling an image from the selected input terminal to be displayed, wherein:
    a first input source is coupled to a first input terminal,
    a second input source is coupled to a second input terminal,
    names of the first and second input terminals are displayed in the first menu,
    a name of the first input source corresponding to the first input terminal is not displayed in the first menu, and
    the name of the second input terminal is displayed in the first menu with a name of the second input source which corresponds to the second input terminal, the name of the second input source is editable and the name of the first input source is not editable by a user.

18. The method of claim 17, wherein controlling the image to be displayed comprises:
    displaying the image from the selected input terminal with the name of the input terminal and the name of the input source corresponding to the input terminal, wherein the first menu is not displayed when the image and both names are displayed; and the method further comprises stopping display of both names after a predetermined period of time.

19. The method of claim 17, further comprising:
    receiving a fourth command signal for selecting an input source label menu;
    reading information on at least one of the input terminals stored in the memory; and
    displaying information indicative of one or more kinds of input sources suitable for the at least one of the input terminals in the input source label menu.

20. The method of claim 19, wherein the input source label menu further comprises system information corresponding to one or more of the input sources.

21. The method of claim 17, wherein the first command signal is received from a communication link coupled to a remote controller or from a key panel in the display device, and wherein the first command signal is received based on activation of a hot key in the remote controller or key panel.

22. The method of claim 18, further comprising:
    receiving a confirmation signal for displaying both names; and
    displaying said both names for the predetermined period of time.

23. The method of claim 17, wherein at least one of input terminals is positioned at a first region of the display device and another one of the input terminals is positioned at a second region of the display device different from the first region, and wherein the first and second regions are selected from the group consisting of a side surface, a front surface, or a rear surface of the display device.

24. The method of claim 17, wherein the image comprises at least one of video information, text information or supplemental information.

25. The method of claim 1, wherein the name of the first input source corresponding to the first input terminal is not displayed in the first menu.

26. The method of claim 17, further comprising:
    receiving an editing signal to edit an input source name;
    entering an editing mode after receiving the editing signal; and
    excluding from said editing mode the name corresponding to the first input source corresponding to the first input terminal.

27. The method of claim 26, further comprising:
    editing the name of the second input source as displayed in the first menu after information indicative of a different name is received.

28. The method of claim 17, wherein the name of the first input source corresponding to the first input terminal is not displayed in the first menu.

29. A method for labeling input sources in a display device, comprising:
    receiving a first command signal for selecting a main input menu;
    displaying the main input menu stored in a memory, wherein the main input menu lists a name of one or more input terminals and a name of one or more input sources corresponding to the one or more input terminals, the main input menu further comprising a first region having one or more editable names of corresponding ones of the input sources and a second region having one or more uneditable names according to a type of corresponding ones of the input terminals;
    receiving a second command signal for selecting one of the input terminals;
    displaying an image from the selected input terminal with the name of the input terminal and the name of the input source corresponding to the input terminal, wherein the main input menu is not displayed when the image and the names of the selected input terminal and the input source corresponding to the selected input terminal are displayed; and
    causing display of the names of the selected input terminal and the input source corresponding to the selected input terminal to disappear after a predetermined period of time expires.

30. A method for labeling input sources in a display device, comprising:
    receiving a first command signal for selecting an input source label menu;
    displaying the input source label menu, the input source label menu comprising both a list of input terminals and an input field for selection of a name of an input source corresponding to one or more of the input terminals, wherein the input field is configured to allow for selection of one of pre-stored representative identifications (IDs) for the one or more input terminals, wherein the input field is further configured to allow a user to manually input a representative ID of a corresponding one of input sources, the manually input representative ID being different from the pre-stored representative identifications, and wherein the manually input representative ID comprises a textual description of the corresponding one of input sources;

receiving a second command signal for selecting the name of the input source for one of the input terminals;

storing the selected name of the input source corresponding to said one of the input terminals in a memory;

receiving a third command signal for selecting a main input menu; and displaying the name of said one of the input terminals and the stored name of the input source corresponding to said one of the input terminals in the main input menu.

31. A method for labeling input sources in a display device, comprising:

displaying broadcast data;

receiving a first command signal for selecting a main input menu;

displaying the main input menu listing names of input terminals and names of input sources corresponding to the input terminals during displaying the broadcast data, wherein the names of the input terminals and input sources are stored in a memory, the main input menu further comprising a first region including an editable name of one or more of the input sources and a second region including an uneditable name according to a type of one or more of the input terminals;

receiving a second command signal for selecting one of the input terminals; and controlling display of an image from the selected input terminal and stopping display of the broadcast data.

* * * * *